(12) United States Patent
Sakakura

(10) Patent No.: US 7,418,510 B2
(45) Date of Patent: Aug. 26, 2008

(54) NETWORK SYSTEM DYNAMICALLY MADE FOR A SHORT-DISTANCE WIRELESS COMMUNICATION AND NETWORK STRUCTURING METHOD

(75) Inventor: Takashi Sakakura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/234,193

(22) Filed: Sep. 5, 2002

(65) Prior Publication Data
US 2003/0046413 A1 Mar. 6, 2003

(30) Foreign Application Priority Data
Sep. 5, 2001 (JP) .............................. 2001-269335

(51) Int. Cl.
G06F 15/16 (2006.01)
H04L 12/28 (2006.01)
H04Q 7/20 (2006.01)

(52) U.S. Cl. ........................ 709/229; 709/228; 709/249; 370/255; 455/453

(58) Field of Classification Search ................. 709/229, 709/227, 249
See application file for complete search history.

(56) References Cited

U.S. PATENT DOCUMENTS

| | | | |
|---|---|---|---|
| 6,178,334 B1 * | 1/2001 | Shyy et al. .................. 455/503 |
| 6,452,942 B1 * | 9/2002 | Lemieux ..................... 370/468 |
| 6,535,498 B1 * | 3/2003 | Larsson et al. .............. 370/338 |
| 6,691,173 B2 * | 2/2004 | Morris et al. ................ 709/249 |
| 6,704,293 B1 * | 3/2004 | Larsson et al. .............. 370/255 |
| 6,751,200 B1 * | 6/2004 | Larsson et al. .............. 370/255 |
| 6,810,413 B1 * | 10/2004 | Rajakarunanayake et al. ........................... 709/203 |
| 6,879,574 B2 * | 4/2005 | Naghian et al. ............. 370/338 |
| 6,888,817 B1 * | 5/2005 | Shyy et al. .................. 370/347 |
| 6,970,927 B1 * | 11/2005 | Stewart et al. .............. 709/225 |
| 6,985,740 B2 * | 1/2006 | Shyy et al. .................. 455/453 |
| 7,009,956 B2 * | 3/2006 | Heinonen et al. ........... 370/338 |
| 7,151,938 B2 * | 12/2006 | Weigand .................. 455/452.1 |
| 2002/0035699 A1 * | 3/2002 | Crosbie ....................... 713/201 |
| 2002/0147820 A1 * | 10/2002 | Yokote ........................ 709/229 |
| 2003/0149794 A1 * | 8/2003 | Morris et al. ................ 709/249 |
| 2004/0076135 A1 * | 4/2004 | Fredriksson ................ 370/338 |
| 2004/0203380 A1 * | 10/2004 | Hamdi et al. ............... 455/41.2 |

FOREIGN PATENT DOCUMENTS

| | | |
|---|---|---|
| JP | 6-232872 A | 8/1994 |
| JP | 08-037535 | 2/1996 |
| JP | 11-239154 A | 8/1999 |
| WO | WO 01/37497 A1 * | 11/2000 |
| WO | WO 01/41375 A2 * | 11/2000 |
| WO | WO-0137497 A1 | 5/2001 |
| WO | WO-0141375 A2 | 6/2001 |

* cited by examiner

Primary Examiner—Saleh Najjar
Assistant Examiner—V. Korobov
(74) Attorney, Agent, or Firm—Birch, Stewart, Kolasch & Birch, LLP

(57) ABSTRACT

In a network system, an internet is connected with a gateway router through a wire link, a plurality of access routers are connected with each other through wireless links, and one access router is connected with the gateway router through a wireless link. Each wireless link connects a Bluetooth device of one access router and a Bluetooth device of another access router or a Bluetooth device of the gateway router. When a wireless terminal unit is connected with one access router through one wireless link while issuing a network connect request, the gateway router functions as a gateway to the wire link, and an IP route from the wireless link connected with the wireless terminal unit to the wire link is set.

11 Claims, 9 Drawing Sheets

NETWORK SYSTEM DYNAMICALLY MADE FOR A SHORT-DISTANCE WIRELESS COMMUNICATION AND NETWORK STRUCTURING METHOD

BACKGROUND OF THE INVENTION

1. Field of the Invention

The present invention relates generally to a network system obtained by combining a wireless communication system and a cable communication system and a method of making a network, and more particularly to a network system having an access network dynamically made for a short-distance wireless communication and a method of making the access network.

2. Description of Related Art

Portable personal computers, portable information units such as personal digital assistants and internets have spread, and internet connection service through a portable telephone has rapidly spread. Therefore, the demand of wireless data communication service has been increased. In a portable telephone system of the third generation, high speed communication service is performed at a maximum of 2 M bit/sec (Mbps).

However, in contrast to the rapid increase of the demand of the data communication service, the frequency source is limited. Therefore, a method for performing communication at higher efficiency has been desired. In particular, it is afraid that the demand of the data communication service exceeds communication capacity in the peripheries of stations of urban areas.

To heighten the communication capacity, a higher frequency band is used, and micro wave communication in one frequency band is simultaneously performed in many areas by suppressing the output power of radio wave in each area. In particular, it is effective that many wireless communication systems respectively using the micro wave of a low output power are installed in the urban area.

In the current market of the communication system using the micro wave of a low output power, a wireless local area network (LAN) regulated in the Institute of Electrical and Electronic Engineers, Inc. (IEEE) 802.11 has been developed. Also, Bluetooth (registered trademark) have spread to connect information units with each other. The Bluetooth has been developed in place of the technique of infrared connection developed in the Infrared Data Association (IrDA). In the Bluetooth, a frequency band called an Industrial, Scientific and Medical (ISM) band is used because the band can be used for industrial, scientific and medical fields without license, and the output power is suppressed so as to perform a short-distance communication in a communication system at a maximum of 10 to 100 m distance. Therefore, a second communication system can use the same frequency band as that used in the communication system when the second communication system is placed far away from the communication system by the maximum distance or more.

Also, the communication environment of the cable internet connection has been developed to perform the communication at high speed. For example, a technique of DSL (digital subscriber line), cable modem or FTTH (fiber to the home) is used, and the internet connection service performed at a high communication speed of 1 Mbps to 100 Mbps can be used at a low charge such as thousands yen (or tens dollars) per month.

Therefore, it is expected that the wireless data communication service is performed in a private network or a small-sized area by combining the wireless communication system simply performed at a low output power and the cable communication system using the internet connection. For example, in a rail station or a cafe, the cable communication system using the internet connection of a high speed communication is set up, a wireless station is connected with the cable communication system, and the wireless data communication service is performed.

However, in cases where a plurality of wireless stations are disposed to provide the wireless data communication service for many users in a wide service area, it is required to connect cables with the wireless stations at many points in the wireless communication system. Also, it is required to connect a cable with a wireless station each time the wireless station is moved or added. Also, it is required to disconnect a cable from a wireless station each time the wireless station is removed. Therefore, it is troublesome to perform the cable connection with the wireless communication system at many points.

Because a conventional network system has the above-described configuration, a problem has arisen that it is difficult to add or move a wireless station.

In the specification of Published Unexamined Japanese Patent Application No. H8-37535, a technique of making an ad-hoc network is disclosed. In this ad-hoc network, a network is made by a plurality of wireless terminal units not respectively placed in a specific network. Also, the management of a communication route between each pair of mobile wireless terminal units is disclosed in this prior art.

SUMMARY OF THE INVENTION

An object of the present invention is to provide, with due consideration to the drawbacks of the conventional network system and the conventional network system making method, a network system and a network system making method in which a wireless station is easily added or moved.

The object is achieved by the provision of a network system including a wire link, a plurality of wireless links and a gateway router. A wireless terminal unit is connected with the gateway router through the wireless links, and the gateway router is connected with the wire link. The gateway router sets a communication route from the wireless link directly connected with the wireless terminal unit to the wire link to function as a gateway to the wire link.

Also, the object is achieved by the provision of a network making method including the steps of setting a gateway router connected with a wire link, connecting a wireless terminal unit with the gateway router through a plurality of wireless links, and making the gateway router set a communication route from the wireless link directly connected with the wireless terminal unit to the wire link to make the gateway router as a gateway to the wire link.

In the above configuration or steps, the gateway router sets the communication route from the wireless link connected with the wireless terminal unit to the wire link. Accordingly, a wireless station such as a gateway router can be easily added or moved in the network system.

DETAILED DESCRIPTION OF THE PREFERRED EMBODIMENTS

Embodiments of the present invention will now be described with reference to the accompanying drawings.

In the present invention embodied by following embodiments, a wireless station connected with a cable internet and a plurality of independent wireless stations respectively independent of the cable internet are prepared, and each independent wireless station independent of the cable internet is disposed within a communication zone of the wireless station connected with the cable internet or a communication zone of another independent wireless station which can communicates with the wireless station connected with the cable internet. Therefore, an access network can be easily made up from the wireless station connected with the cable internet and the independent wireless stations.

For example, a wireless station for cable connection is connected in a café with a cable connection type internet which is used by a user in an office, an independent wireless station of the user is appropriately disposed or moved in the café, and the independent wireless station of the user is appropriately removed from the café. Therefore, the user can easily perform the communication with another user through the independent wireless station, the wireless station for cable connection and the cable connection type internet while expanding or contracting the access network.

To perform this communication, it is required to dynamically manage the connection among the wireless station for cable connection and the independent wireless stations, and it is required to manage a communication route in the access network made up from the wireless station for cable connection and the independent wireless stations according to a host communication protocol such as an internet protocol (IP).

Embodiment 1

Figure 1:
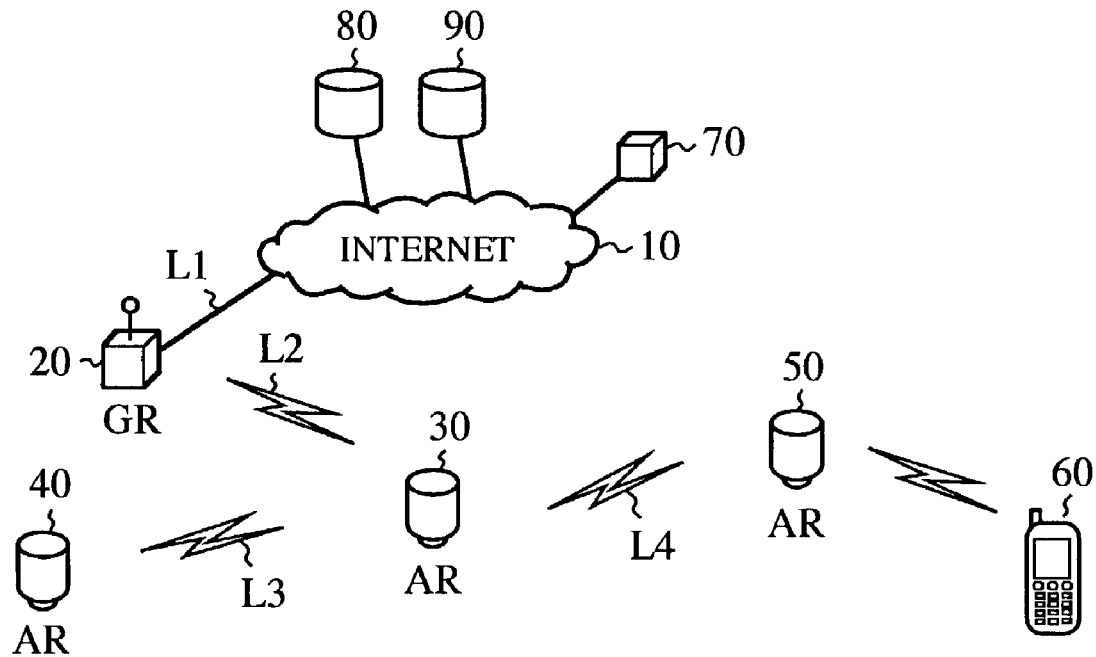
FIG. 1 is a view showing the configuration of a network system according to a first embodiment of the present invention.

FIG. 1 is a view showing the configuration of a network system according to a first embodiment of the present invention.

In FIG. 1, 10 indicates an internet (or a cable network). 20 indicates an IP router (hereinafter called a gateway router) functioning as a wireless station possible to be connected with an internet through a cable. The gateway router 20 formed of one IP router is connected with the internet 10 through a wire link L1. 30, 40 and 50 indicate a plurality of IP routers (hereinafter called access routers) respectively. Each of the access routers 30, 40 and 50 formed of the IP routers functions as an independent wireless station. The access router 30 is connected with the gateway router 20 through a wireless link L2, the access router 40 is connected with the access router 30 through a wireless link L3, and the access router 50 is connected with the access router 30 through a wireless link L4. 60 indicates a wireless terminal unit. 70 indicates a cable terminal unit connected with the internet 10 through a cable. 80 indicates an authentication database for storing pieces of authentication data used for the authentication of wireless terminal units including the wireless terminal unit 60. 90 indicates an accounting database for storing accounting data used to determine the charge for communication for each wireless terminal unit. The wireless terminal unit 60 can be connected with the access router 50 through a wireless link and can communicate with the cable terminal unit 70 through the access router 50, the access router 30, the gateway router 20 and the internet 10.

Figure 2:
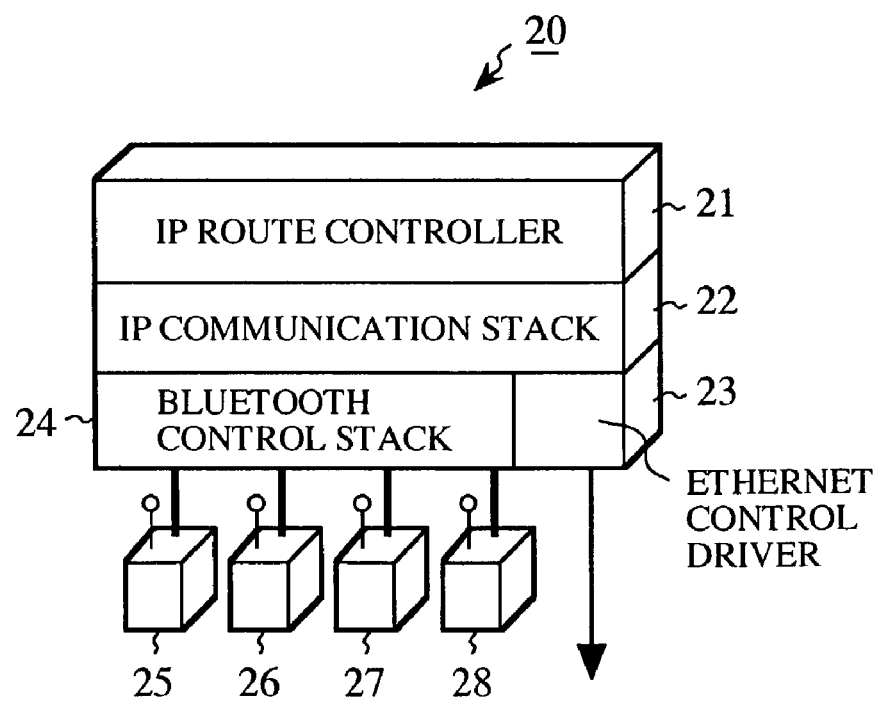
FIG. 2 is a view showing the configuration of a gateway router shown in FIG. 1.
Figure 3:
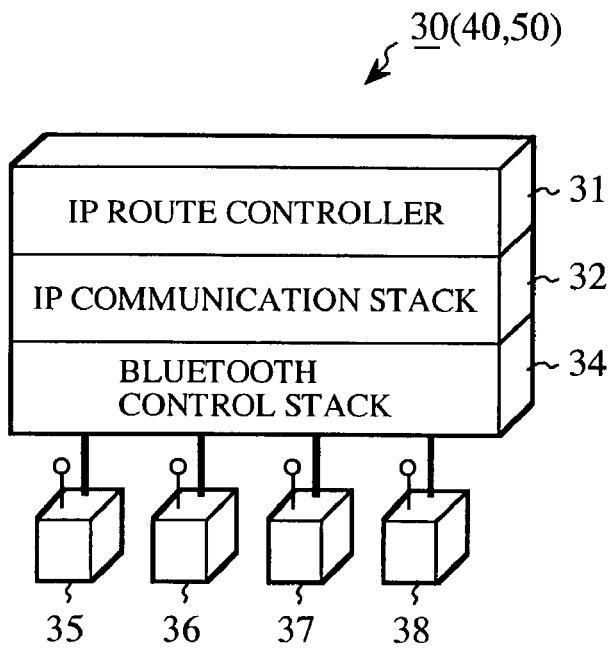
FIG. 3 is a view showing the configuration of each access router shown in FIG. 1.

FIG. 2 is a view showing the configuration of the gateway router 20, and FIG. 3 is a view showing the configuration of each access router 30 (or the access router 40 or 50). Wireless communication devices of the gateway router 20 and the access routers 30 are operated according to the specification of the Bluetooth.

In FIG. 2 and FIG. 3, 21 and 31 indicate IP route controllers respectively. 22 and 32 indicate IP communication stacks respectively. 23 indicates an Ethernet (registered trademark) control driver. 24 and 34 indicate Bluetooth control stacks respectively. 25, 26, 27 and 28 indicate four Bluetooth devices of the gateway router 20 respectively. 35, 36, 37 and 38 indicate four Bluetooth devices of each access router 30 respectively.

A communication route specifying method disclosed in the Published Unexamined Japanese Patent Application No. H8-37535 is performed according to the IEEE 802.11. In this case, one communication channel is used for a plurality of communication devices operated according to the IEEE 802.11 under media access control (MAC) of carrier sense multiple access with collision avoidance (CSMA/CA), and the number of communication devices is not limited. Therefore, the broad casting through the communication channel used in common can be easily performed.

In contrast, the Bluetooth denotes a time division multiple access (TDMA) type communication method, a wireless communication link is formed between each pair of communication devices according to the procedure called paging, and the wireless communication is performed between the communication devices. A plurality of communication devices are set as a master device and a plurality of slave devices, and the slave devices can be connected with the master device under the control of the master device. The maximum number of slave devices is equal to 7.

Also, there are three definitions of the output electric power in the Bluetooth. In case of the output electric power of 1 mW generally used, a maximum communication range is equal to 10 m. To detect another communication device placed in a communication zone of a remarked communication device, the Bluetooth has the procedure called "inquiry". When remarked communication device issues the procedure of "inquiry", identifiers of all communication devices placed in the communication zone of the remarked communication device can be obtained from the communication devices. Though the maximum number of wireless communication links of one communication device is limited to seven, responses of identifiers can be obtained from a maximum of 255 communication devices according to the procedure of "inquiry".

Figure 4:
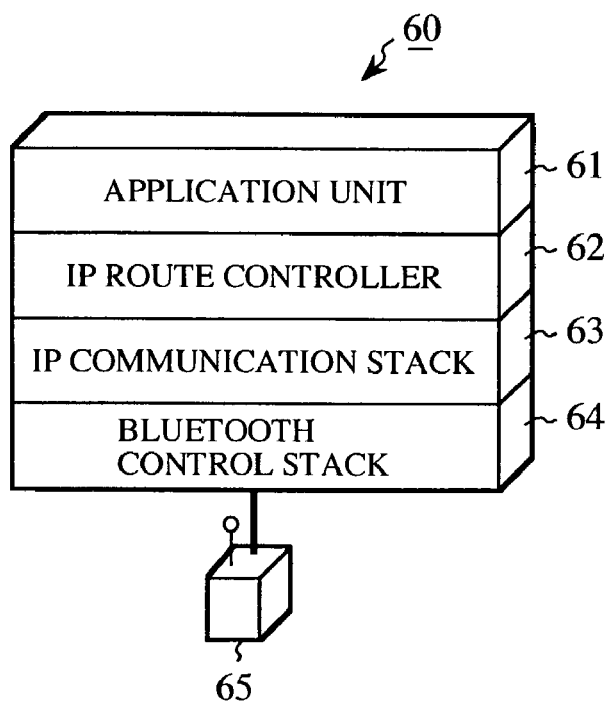
FIG. 4 is a view showing the configuration of a wireless terminal unit shown in FIG. 1.

The gateway router 20 comprises the four Bluetooth devices 25, 26, 27 and 28, the Bluetooth control stack 24 for controlling the Bluetooth devices 25, 26, 27 and 28, a communication unit composed of the Ethernet and the Ethernet control driver 23, the IP communication stack 22 for performing the IP packet control such as "forward" corresponding to route information of IP packet, and the IP route controller 21 for performing the connection control for the Bluetooth devices 25, 26, 27 and 28 and the management of IP route. The access router 30 comprises the four Bluetooth devices 35, 36, 37 and 38, the Bluetooth control stack 34 for controlling the Bluetooth devices 35, 36, 37 and 38, the IP communication stack 32 for performing the IP packet control such as "forward" corresponding to route information of IP packet, and the IP route controller 31 for performing the connection control for the Bluetooth devices 35, 36, 37 and 38 and the management of IP route. FIG. 4 is a view showing the configuration of the wireless terminal unit 60.

In FIG. 4, 61 indicates an application unit such as a browser or an audio codec. 62 indicates an IP route controller. 63 indicates an IP communication stack. 64 indicates a Bluetooth control stack. 65 indicates a Bluetooth device functioning as a communication unit.

Next, a network making method applied for a simple example of a network system according to the first embodiment of the present invention will be described below.

Figure 5:
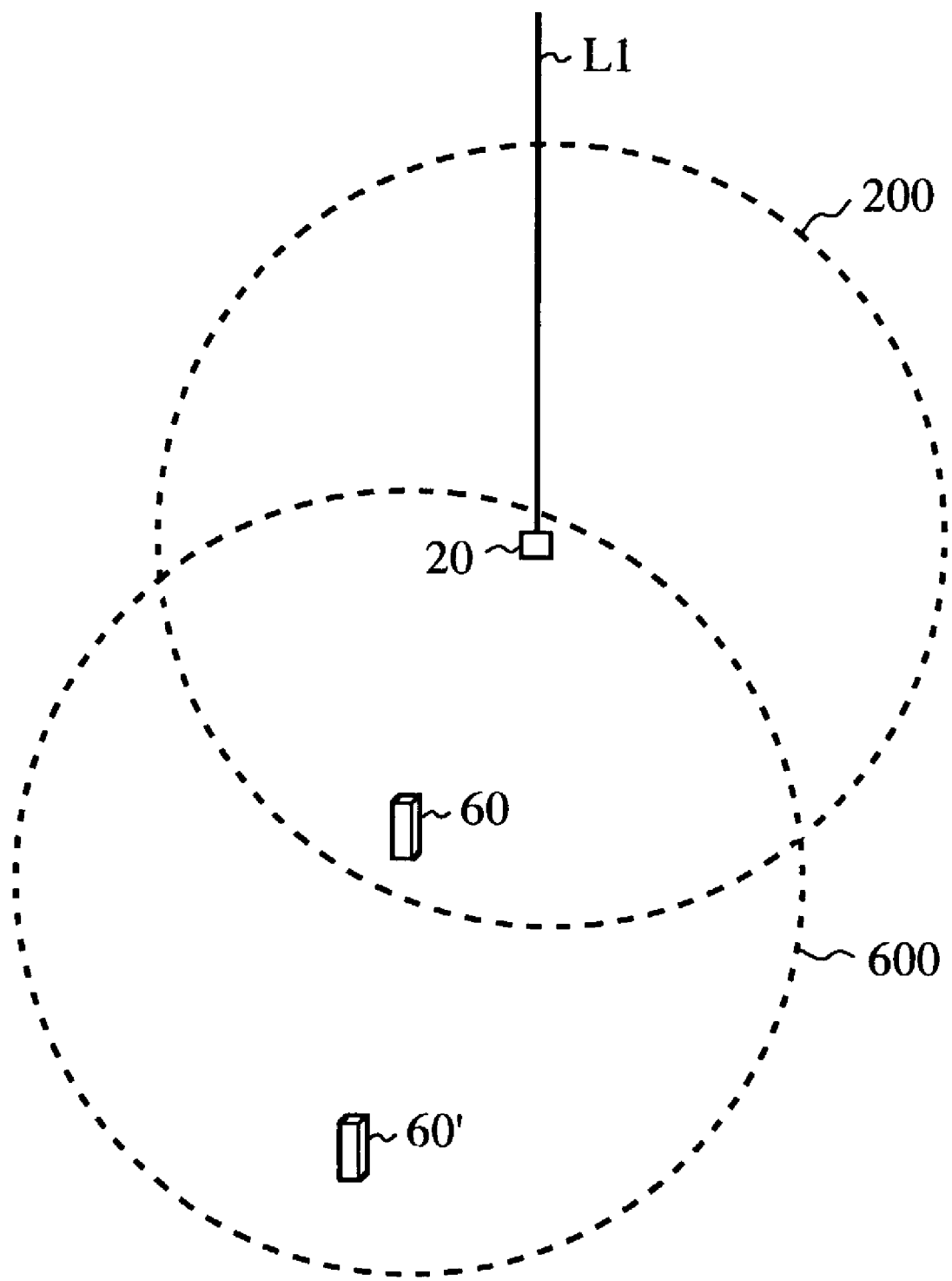
FIG. 5 is a schematic view showing the configuration of a network system having only the gateway router according to an example of the first embodiment of the present invention.

FIG. 5 is a schematic view showing the configuration of a network system having only the gateway router 20 according to a simple example of the first embodiment of the present invention.

The gateway router 20 is disposed at a certain position and is connected with the internet 10 (refer to FIG. 1) through the wire link L1. In this example, any of the access routers 30, 40 and 50 is not disposed in the network system. Also, each of the Bluetooth devices 25, 26, 27 and 28 of the gateway router 20 is set in a standby mode and is periodically set in a page scan state and an inquiry scan state during the standby mode. Therefore, each of the Bluetooth devices 25, 26, 27 and 28 monitors a page request and an inquiry request periodically.

In this embodiment, an inactive state continuation parameter of the standby mode is set to zero in each of the Bluetooth devices 25 to 28 and 35 to 38 of the gateway router 20 and the access routers 30 to 50. Therefore, there is no inactive time period in each Bluetooth device, and each of both the page request and the inquiry request is repeatedly monitored in each Bluetooth device. Accordingly, a response time for each of both the page request and the inquiry request can be considerably shortened.

In FIG. 5, the gateway router 20 has a communication zone 200, and the wireless terminal unit 60 has a communication zone 600. The wireless terminal unit 60 is movable to be positioned within the communication zone 200 of the gateway router 20 while positioning the gateway router 20 within the communication zone 600 of the wireless terminal unit 60. Also, a second wireless terminal unit 60' is positioned within the communication zone 600 of the wireless terminal unit 60.

A user moves the wireless terminal unit 60 to be positioned within the communication zone 200 of the gateway router 20 while positioning the gateway router 20 within the communication zone 600 of the wireless terminal unit 60, and the user visually ascertains the existence of the gateway router 20 functioning as a wireless station in the network system. Thereafter, to perform a connection of the wireless terminal unit 60 with the network system, the user manipulates the application unit 61 of the wireless terminal unit 60 to start the execution of a communication application such as a Web browser. Therefore, the wireless terminal unit 60 issues the procedure of "inquiry" denoting an inquiry request, and the connection operation is started.

When the wireless terminal unit 60 issues "inquiry" of the Bluetooth, all Bluetooth devices placed within the communication zone 600 of the wireless terminal unit 60 respond to the "inquiry". In this embodiment, a Bluetooth device of the second wireless terminal unit 60' and the Bluetooth devices 25 to 28 of the gateway router 20 are set to candidates for a Bluetooth device responding to the "inquiry" issued by the wireless terminal unit 60.

In this case, the Bluetooth devices 25 to 28 of the gateway router 20 are respectively set in the standby mode, and the inactive state continuation parameter of the standby mode is set to zero. Also, the wireless terminal unit 60 waits for a response from another Bluetooth device during a time-out time period. When the time-out time period passes, the wireless terminal unit 60 judges the existence of another Bluetooth device responding to the "inquiry" issued by the wireless terminal unit 60. Also, the response time of each Bluetooth device of the gateway router 20 is very short as compared with that of the second wireless terminal unit 60', and the time-out time period for the procedure of "inquiry" is set in the wireless terminal unit 60 so as to be sufficiently longer than the response time of each Bluetooth device of the gateway router 20. Therefore, a Bluetooth device of the second wireless terminal unit 60' can not respond to the "inquiry" issued by the wireless terminal unit 60 within the time-out time period of the wireless terminal unit 60, but the gateway router 20 can respond to the "inquiry". As a result, the wireless terminal unit 60 receives four device addresses (for example, 0x0050CD00053A, 0x0050CD00053B, 0x0050CD00053C and 0x0050CD00053D) of the Bluetooth devices 25 to 28 from the gateway router 20 as the response from the gateway router 20.

Thereafter, the wireless terminal unit 60 tries a connection with the Bluetooth devices 25 to 28 of the gateway router 20 one by one according to the device addresses to perform an internet protocol (IP) connection with one of the Bluetooth devices 25 to 28. In detail, in the wireless terminal unit 60, the device address 0x0050CD00053A placed at the top of a list is first selected, and the processing of the IP connection with the Bluetooth device 25 of the gateway router 20 is started. The processing of the IP connection performed in the wireless terminal unit 60 and the processing of the IP connection performed in a remarked IP router (in this example, the gateway router 20) are described with reference to FIG. 6.

Figure 6:
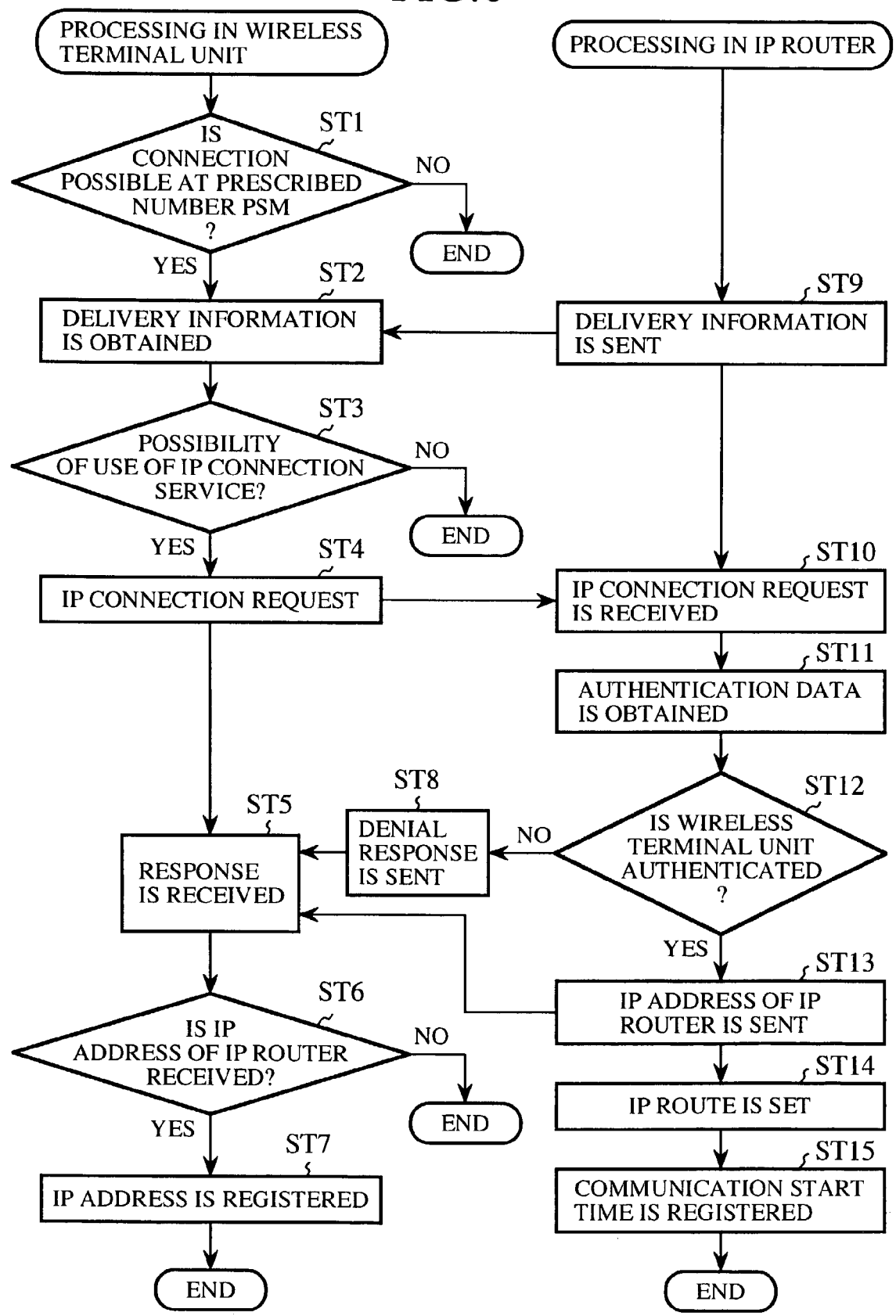
FIG. 6 is a flow chart showing an operation of the network system according to the first embodiment of the present invention.

FIG. 6 is a flow chart showing an operation of the network system according to the first embodiment of the present invention.

In a step ST1, the wireless terminal unit 60 issues the procedure of page to one selected Bluetooth device of the remarked IP router according to a prescribed number PSM assigned to the wireless terminal unit 60 for the negotiation of the IP connection with the selected Bluetooth device in the network system. The PSM is defined as an identifier of an upper L2CAP stack of link processing stacks L2CAP used in the Bluetooth. In cases where the remarked IP router is placed in the network system with which the IP-connection of the wireless terminal unit 60 is desired, a terminal IP connection negotiation unit placed in the remarked IP router of the network system is called up by the prescribed number PSM. In contrast, in cases where the prescribed number PSM is not set in the selected Bluetooth device because the selected Bluetooth device differs from that of the remarked IP router of the network system, the wireless terminal unit 60 fails in the trial of the IP connection ("NO" in the step ST1), and the processing of the IP connection is ended. Therefore, the wireless terminal unit 60 tries a connection with another Bluetooth device.

In cases where the wireless terminal unit 60 succeeds in the trial of the IP connection with the remarked IP router of the network system ("YES" in the step ST1), the wireless terminal unit 60 waits for data sent from the remarked IP router. When the remarked IP router receives information indicating the IP connection with the wireless terminal unit 60, data indicating the possibility or no possibility of the use of the IP connection service and benefit information such as coupon data of a shop having the remarked IP router are sent as delivery information from the remarked IP router to the wireless terminal unit 60 (step ST9), and the wireless terminal unit 60 receives the data and the benefit information sent from the remarked IP router (step ST2). Here, in cases where the user of the wireless terminal unit 60 performs the trial of the IP connection with the remarked IP router to obtain the benefit information, it is not required to continue the processing of the IP connection. Also, the data sent from the IP router includes hop information indicating a hop count. The hop count denotes the number of access routers placed between the wire link L1 connected with the gateway router 20 and the wireless link connected to the wireless terminal unit 60. In the example shown in FIG. 5, because the remarked IP router IP-connected with the wireless terminal unit 60 agrees with the gateway router 20, the hop count is equal to 0.

Thereafter, it is checked in the wireless terminal unit 60 whether or not the data indicates the possibility or no possibility of the use of the IP connection service (step ST3). For example, in cases where the Bluetooth device corresponding to the selected device address is used only for the IP connection between IP routers (that is, between access routers or between a gateway router and an access router), the data sent from the remarked IP router to the wireless terminal unit 60 indicates no possibility of the use of the IP connection service. This type of Bluetooth device is called an inter-router connection dedicated device and communicates with one IP router (that is, one access router or the gateway router 20) through a type of inter-router connection dedicated wireless link. Also, even though the Bluetooth device corresponding to the selected device address is used only for the IP connection between an IP router and a wireless terminal unit (that is, between a gateway router and a wireless terminal unit or between an access router and a wireless terminal unit), in cases where a non-used link does not remain in the Bluetooth device, the data sent from the remarked IP router to the wireless terminal unit 60 indicates no possibility of the use of the IP connection service. This type of Bluetooth device is called a terminal connection dedicated device and communicates with a wireless terminal unit through a type of terminal connection dedicated wireless link. The terminal connection dedicated device supports a plurality of wireless terminal units to communicate with each of the wireless terminal units through one type of terminal connection dedicated wireless link. Therefore, in cases where the terminal connection dedicated device does not have a non-used link, a maximum number of wireless terminal units have already communicated with the terminal connection dedicated device, and no wireless terminal unit can additionally communicate with the terminal connection dedicated device.

In cases where the data indicates no possibility of the use of the IP connection service ("NO" in the step ST3), the processing of the IP connection for the selected Bluetooth device is ended. Therefore, the wireless terminal unit 60 tries a connection with another Bluetooth device of the remarked IP router (that is, the gateway router 20). Here, because Bluetooth devices of IP routers are classified into the inter-router connection dedicated device and the terminal connection dedicated device, the IP connection of the wireless terminal unit 60 with one IP router can be easily performed, and the IP connection between IP routers (that is, between access routers or between one access router and the gateway router 20) can be easily performed.

In contrast, in cases where the Bluetooth device corresponding to the selected device address is classified into the terminal connection dedicated device and the Bluetooth device has a non-used wireless link of the type of terminal connection dedicated wireless link, it is judged in the wireless terminal unit 60 that the data indicates the possibility of the use of the IP connection service ("YES" in the step ST3). In this case, in a step ST4, the wireless terminal unit 60 performs the IP connection with the Bluetooth device of the remarked IP router while using the prescribed number PSM for IP connection, and an IP connection request and a device address of the wireless terminal unit 60 are sent from the wireless terminal unit 60 to the remarked IP router. In the remarked IP router, after the IP connection with the wireless terminal unit 60, the IP connection request and the device address of the wireless terminal unit 60 sent from the wireless terminal unit 60 are received (step ST10). Here, in this embodiment, the step ST10 is performed after the step ST9. However, it is applicable that the step ST9 and the step ST10 be performed in parallel to each other.

Thereafter, because the remarked IP router receives the device address of the wireless terminal unit 60, the remarked IP router obtains authentication data of the wireless terminal unit 60 from the authentication database 80 according to the device address of the wireless terminal unit 60. Thereafter, in a step ST12, it is checked according to the authentication data whether or not the IP connection with the wireless terminal unit 60 is rightful. In cases where no authentication data of the wireless terminal unit 60 is registered in the authentication database 80, it is judged that the IP connection with the wireless terminal unit 60 is not rightful ("NO" in the step ST12), and a denial response is sent from the remarked IP router to the wireless terminal unit 60 (step ST8). In contrast, in cases where the authentication data of the wireless terminal unit 60 is registered in the authentication database 80, it is judged that the IP connection with the wireless terminal unit 60 is rightful ("YES" in the step ST12), and an IP address of the remarked IP router is sent from the remarked IP router to the wireless terminal unit 60 (step ST13). Therefore, the IP connection with the wireless terminal unit 60 not registered in the authentication database 80 can be avoided. In this embodiment, the data comparison of one-way hash is adopted for the check of the righteousness of the wireless terminal unit 60 in the step ST12. However, it is applicable that authentication procedure such as a challenge handshake authentication protocol (CHAP) method be added to the check in the step ST12.

Thereafter, in the wireless terminal unit 60, either the denial response or the response of the IP address of the remarked IP router is received (step ST5), and it is checked whether or not the wireless terminal unit 60 is authenticated in the network system (step ST6). In cases where no IP address of the remarked IP router is received but the denial response is received ("NO" in the step ST6), the IP connection is ended.

In the network system, the internet protocol of a version 6 is adopted. Therefore, in the wireless terminal unit 60, an IP address of a subnet common to both the remarked IP router and the wireless terminal unit 60 can be produced as a stateless address from both the device address of the remarked IP router and the device address of the wireless terminal unit 60. The IEEE device address adopted in the Bluetooth is equivalent to the MAC address adopted for the Ethernet device.

Also, in cases where the IP address of the remarked IP router is received in the wireless terminal unit 60 ("YES" in the step ST6), an IP address of a subnet common to both the remarked IP router and the wireless terminal unit 60 is registered in the wireless terminal unit 60 (step ST7).

In cases where it is desired that the internet protocol of a version 4 is adopted for the network system as another example, a management unit (or a dynamic host configuration protocol (DHCP) server) of IP addresses is disposed in the network system. In this case, the sending of the IP address of the remarked IP router in the step ST13 is not performed, but an IPv4 (internet protocol version 4) address assigned by the DHCP server is sent from the network system to the wireless terminal unit 60. The IPv4 address is used in the wireless terminal unit 60 as an address of the wireless terminal unit 60. Also, as another example, in cases where it is required that a fixed IP address is provided for the wireless terminal unit 60, the IP address of the subnet registered in the step ST7 can be used as a care-of-address in a mobile IP unit.

Also, in the remarked IP router, the IP address of the subnet, which is the same as that automatically produced in the wireless terminal unit 60, is produced in the same manner as in the wireless terminal unit 60, an IP route from the wire link L1 to the wireless link connected with the wireless terminal unit 60 is set in an IP route table of the gateway router 20 (step ST14), and a communication start time of the wireless terminal unit 60 is registered in the accounting database 90 by using the received device address of the wireless terminal unit 60 as a key to specifying the wireless terminal unit 60 (step ST15). Thereafter, the type of terminal connection dedicated wireless link of the Bluetooth between the remarked IP router and the wireless terminal unit 60 is maintained, and the wireless terminal unit 60 is set in a state of the IP connection with the IP router.

Thereafter, the communication for all communication applications in the wireless terminal unit 60 is completed, the IP route control unit 62 of the wireless terminal unit 60 disconnects the type of terminal connection dedicated wireless link of the Bluetooth. That is, a socket of the wireless terminal unit 60 is closed. When the wireless link is disconnected, the wireless terminal unit 60 notifies the remarked IP router of an event of the link disconnection through the IP communication stack 63 of the wireless terminal unit 60 and the IP communication stack 22 of the remarked IP router, the IP route from the wire link L connected with the gateway router 20 to the wireless link connected with the wireless terminal unit 60 is deleted from the IP route table of the gateway router 20, and a current time is registered in the accounting database 90 as a communication complete time.

The accounting database 90 manages an integrated value of communication time periods for each wireless terminal unit. The communication time period (or the connect time period) denotes a time period from the communication start time to the communication complete time.

As is described above, in the first embodiment, the network system has the gateway router 20 functioning as a wireless station, and the gateway router 20 has the wire link L1 connected with the internet 10 and a wireless link or a plurality of wireless links. When the wireless terminal unit 60 is connected with the gateway router 20 through one wireless link, the IP route from the wire link L1 connected with the internet 20 to the wireless link connected with the wireless terminal unit 60 is set in the gateway router 20. Accordingly, the gateway router 20 functions as a gateway to the wire link L1, and a wireless station such as a gateway router can be easily added or moved in the network system.

Also, in the first embodiment, the network system has the access routers 30 to 50 (or a group of access routers) functioning as a plurality of wireless stations independently operasted, and the access routers 30 to 50 have only a plurality of wireless links to connect the gateway router 20 and the wireless terminal unit 60 though the wireless links. When the wireless terminal unit 60 is connected with the access router 50, an IP route from the wireless link connected with the wireless terminal unit 60 to the wireless link L2 connected with the gateway router 20 through the other access links is set by the access routers 30 to 50, and the IP route from the wireless link connected with the wireless terminal unit 60 to the wireless link L2 connected with the gateway router 20 through the wireless link L4 connected with the access routers 30 and 50 (or the other wireless links connected with the access routers) is set in the gateway router 20. Therefore, the gateway router 20 functions as a gateway to the wire link L1. Accordingly, a wireless station such as an access router can be easily added or moved in the network system.

Also, in the first embodiment, the network system has the authentication database 80 connected with the internet 20, the authentication database 80 registers pieces of authentication data proving the righteousness of wireless terminal units including the wireless terminal unit 60, and the IP route is set only for the wireless terminal unit 60 of which the righteousness is proved with reference to the authentication data of the wireless terminal unit 60. Therefore, the communication service can be provided only for the wireless terminal unit 60 of which the authentication data is registered in the authentication database 80.

Also, in the first embodiment, the network system has the accounting database 90 connected with the internet 20, the accounting database 90 registers the accounting information used to determine the charge for communication for each wireless terminal unit, and the accounting information corresponding to the IP connection time period of each wireless terminal unit is registered in the accounting database 90. Therefore, the charge for communication can be managed according to the IP connection time period.

Also, in the first embodiment, the gateway router 20 provides benefit information registered in advance for the wireless terminal unit 60 connected with the network system through the wireless link. Therefore, the benefit information can be easily provided for the wireless terminal unit 60.

Also, in the first embodiment, the wireless links are classified in advance into the type of inter-router connection dedicated wireless link and the type of terminal connection dedicated wireless link, the gateway router 20 is connected with the access router 30 through the type of inter-router connection dedicated wireless link, each access router is connected with another access router through the type of inter-router connection dedicated wireless link, and the wireless terminal unit 60 is connected with the gateway router 20 or one access router through the type of terminal connection dedicated wireless link. Therefore, the gateway router 20 and the access routers 30 to 50 can be easily connected with each other through the type of inter-router connection dedicated wireless link, and the wireless terminal unit 60 can be easily connected with one of the gateway router 20 and the access routers 30 to 50 through the type of terminal connection dedicated wireless link.

Also, in the first embodiment, each of the Bluetooth devices 25 to 28 and 35 to 38 of the gateway router 20 and the access routers 3o to 50 has a plurality of wireless links. Therefore, each Bluetooth device can connect with a plurality of wireless terminal units.

Also, in the first embodiment, the inactive time period in the standby mode is set to zero in each Bluetooth device. Therefore, the response time for each of the page request and the inquiry request can be considerably shortened.

Embodiment 2

In a second embodiment, one Bluetooth device of one IP router (for example, the gateway router 20 or one of the access routers 30 to 50), which is IP-connected with two wireless terminal units or more, will be described below.

When a first wireless terminal unit issues the procedure of "inquiry" on condition that a remarked Bluetooth device of the IP router has already IP-connected with a second wireless terminal unit is placed in the communication zone of the first wireless terminal unit, the response of the remarked Bluetooth device of the IP router to the "inquiry" request is delayed because of the IP connection of the remarked Bluetooth device with the second wireless terminal unit. Therefore, an IP-connection request sent from the first wireless terminal unit is registered at the bottom position of an inquiry response list. In other words, the lower the number of wireless terminal units already IP-connected with a Bluetooth device, the more the IP-connection of an additional wireless terminal unit with the Bluetooth device is preferentially tried. Thereafter, in the same manner as in the first embodiment, a plurality of additional wireless terminal units are IP-connected with the remarked Bluetooth device one after another until the number of wireless terminal units already IP-connected with the remarked Bluetooth device reaches a maximum number.

Embodiment 3

In a third embodiment, the most simple example of an access network making method will be described below.

The wireless terminal unit 60 of the first embodiment shown in FIG. 5 is replaced with a selected Bluetooth device of a remarked access router. In the step ST3 shown in FIG. 6, it is checked in the selected Bluetooth device of the remarked access router whether or not data sent from the gateway router 20 indicates the possibility or no possibility of the use of the IP connection service. Also, in the step ST7, a device address of the selected Bluetooth device of the remarked access router is registered. Also, an IP route from a wireless link connected with the selected Bluetooth device of the remarked access router to the wire link L1 connected with the gateway router 20 is set as an IP default route, and the hop count denoting the number of access routers placed between the wire link L1 connected with the gateway router 20 and a wireless link connected to a wireless terminal unit is set to 1. Therefore, an access network can be made up while half-dynamically connecting the selected Bluetooth device of the remarked access router with the gateway router 20. Accordingly, as the most simple example, a method of making the access network can be obtained by adding the above-described procedure and the other steps described with reference to FIG. 6 in the first embodiment.

Embodiment 4

Figure 7:
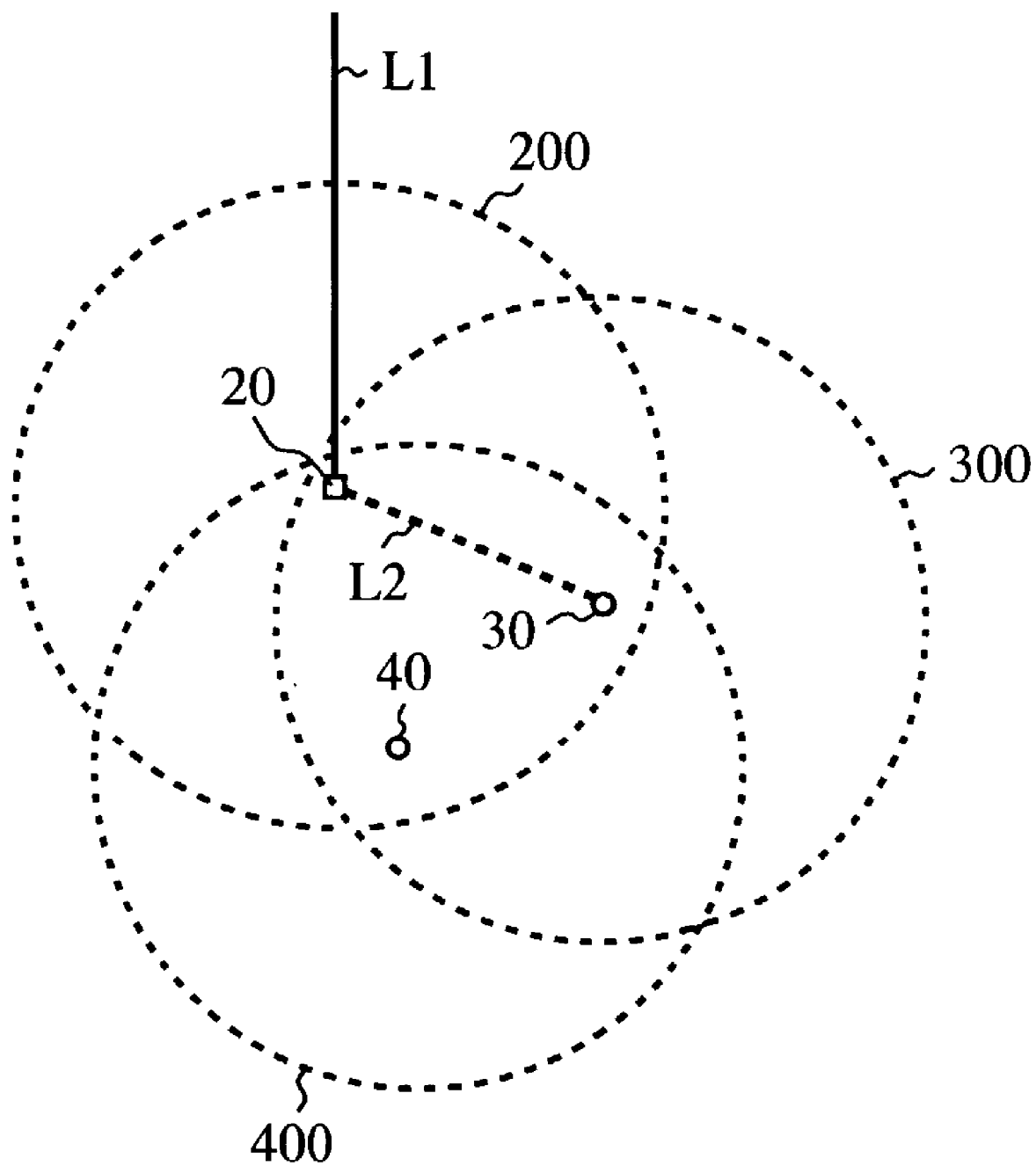
FIG. 7 is a schematic view showing the configuration of a network system according to a fourth embodiment of the present invention.

FIG. 7 is a schematic view showing the configuration of a network system according to a fourth embodiment of the present invention. The constituent elements, which are the same as those shown in FIG. 1, are indicated by the same reference numerals as those of the constituent elements shown in FIG. 1.

In FIG. 7, 200 indicates a communication zone of the gateway router 20. 300 indicates a communication zone of the access router 30. 400 indicates a communication zone of the access router 40. The access router 40 is positioned within both the communication zone 200 and the communication zone 300, the gateway router 20 is positioned within both the communication zone 300 and the communication zone 400, and the access router 30 is positioned within both the communication zone 200 and the communication zone 400. The wireless link L2 designated by a dotted line is established and maintained between the gateway router 20 and the access router 30.

As is described in the step ST2 and the step ST9 of the first embodiment (refer to FIG. 6), in cases where the access router 40 searches the other access routers and the gateway router 20 for a Bluetooth device of a specific IP router (one) to be IP-connected with the access router 40, data of the hop count denoting the number of access routers placed between the gateway router 20 and the specific IP router is sent from the IP router to the access router 40. In the fourth embodiment, the network system including the access router 40 shown in FIG. 7 is made so as to quickly communicate between a user of a wireless terminal unit and another user of the cable terminal unit 70 through the access router 40 and the internet 10.

In cases where a plurality of IP routers (denoting access routers and the gateway router 20 or only access routers) are possible to be IP-connected with the access router 40, the hop denoting the number of access routers placed between the gateway router 20 and one IP router is checked for each IP router possible to be I-connected with the access router 40, a specific IP router corresponding to the smallest hop count is selected, the access router 40 is IP-connected with one Bluetooth device of the specific IP router, and an IP route from the wire link L1 to a wireless link connected with the access router 40 through the specific IP router is set in the gateway router 20

An operation for selecting a specific IP router corresponding to the smallest hop count will be described with reference to FIG. 8. In this embodiment, the operation of a specific IP router IP-connected with the access router 40 is the same as that in the first embodiment, so that additional description of the operation of the specific IP router is omitted.

Figure 8:
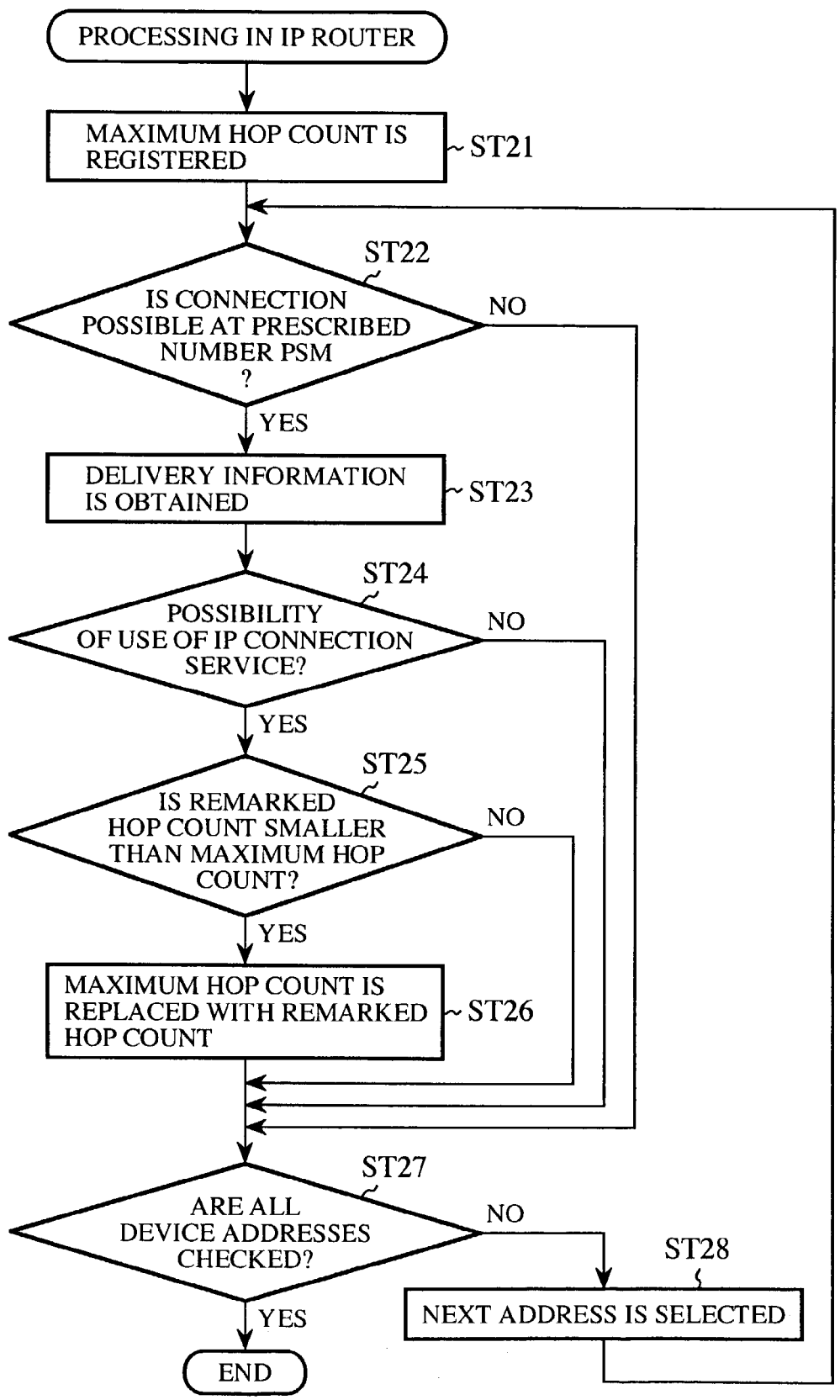
FIG. 8 is a flow chart showing an operation of an access router according to a network making method in the network system of the fourth embodiment of the present invention.

FIG. 8 is a flow chart showing an operation of the access router 40 according to a network making method in the network system of the fourth embodiment of the present invention.

In a step ST21, a maximum hop count is registered in advance as an initial value. The maximum hop count is set to a sufficiently high value. Thereafter, when the access router 40 issues the procedure of "inquiry", a plurality of device addresses of all Bluetooth devices of a plurality of IP routers possible to be IP-connected with the access router 40 are received in the access router 40. In a step ST22, the access router 40 tries an IP-connection with a Bluetooth device of a remarked IP router corresponding to one device address by using a prescribed number PSM for each device address. In cases where the IP-connection of the access router 40 with the Bluetooth device of the remarked IP router is successfully performed, delivery information including data of a remarked hop count corresponding to the remarked IP router is sent from the remarked IP router and is received in the access router 40 (step ST23). In a step ST24, it is checked whether or not the Bluetooth device of the remarked IP router corresponds to a type of inter-router connection dedicated wireless link. In cases where the Bluetooth device of the remarked IP router corresponds to a type of inter-router connection dedicated wireless link, it is checked whether or not the remarked hop count denoting the number of access routers placed between the gateway router 20 and the remarked IP router is smaller than the maximum hop number initially set (step ST25). In cases where the remarked hop count is smaller than the maximum hop count, the maximum hop count is replaced with the remarked hop count, and the remarked hop count is stored to renew the maximum hop count (step ST26). Thereafter, in a step ST27, it is checked whether or not all hop counts corresponding to all the received device addresses are checked. In cases where all hop counts corresponding to all the received device addresses are not checked, another device address indicating a Bluetooth device of a remarked IP router not checked is selected (step ST28), and the procedure from the step ST22 to the step ST27 is again performed. In cases where all hop counts corresponding to all the received device addresses are checked, a specific Bluetooth device of a specific IP router corresponding to the smallest hop count stored in the step ST26 is selected, the access router 40 is IP-connected with the specific Bluetooth device of the specific IP router, and an IP route from the access router 40 to the gateway router 20 through the specific IP router is set in the gateway router 20.

Therefore, a network system including the access router 40 can be made on condition that the access router 40 is IP-connected with the specific IP router corresponding to the smallest hop count, and a user of a wireless terminal unit can quickly communicate with a user of the cable terminal unit 70 by connecting the wireless terminal unit with the access router 40.

The fourth embodiment is not limited to an algorithm of the network making method shown in FIG. 8, and it is applicable that a specific Bluetooth device of a specific IP router corresponding to the smallest hop count be selected from all Bluetooth devices of a plurality of IP routers possible to be IP-connected with the access router 40 and the access router 40 be IP-connected with the specific Bluetooth device of the specific IP router to make up the network system including the access router 40.

Also, in the fourth embodiment, it is judged that the data transfer capability in an IP-route from the access router 40 to the wire link L1 is heightened as a hop count denoting the number of access routers placed between the gateway router 20 and the access router 40 is reduced, and a specific Bluetooth device of a specific IP router corresponding to the smallest hop count is selected and is IP-connected with the access router 40 to quickly communicate between a user of a wireless terminal unit and a user of the wire terminal unit 70 through the access router 40. However, it is applicable that a specific IP router to be IP-connected with the access router 40 be selected on condition that a data transfer rate in the wireless links placed between the access router 40 and the gateway router 20 is maximized. Also, it is applicable that a specific IP router to be IP-connected with the access router 40 be selected by considering both the hop count and the data transfer rate.

As is described above, in the fourth embodiment, the number of wire links, the data transfer capability of the wire link L1, the number of wireless links possible to reach the wire link L1 and the data transfer capability of each wireless link are considered as attribute information, and a specific IP router of the network system to be IP-connected with an access router not connected with the network system through one wireless link is selected with reference to the attribute information. Accordingly, the addition or movement of an access router (or a wireless station) can be easily performed in the network system. Also, an access router can be added to the network system according to a network making method so as to quickly communicate between users through the access router and the internet 10.

Also, in the fourth embodiment, the data transfer capability is heightened by reducing the hop count denoting the number of access routers placed between the gateway router 20 and an access router to be IP-connected with the network system. Therefore, the data transfer capability can be reliably heightened in the network making method.

Also, in the fourth embodiment, the data transfer capability is heightened by heightening the data transfer rate in the IP route from the network 10 and an access router to be IP-connected with the network system. Therefore, the data transfer capability can be reliably heightened in the network making method.

Embodiment 5

Figure 9:
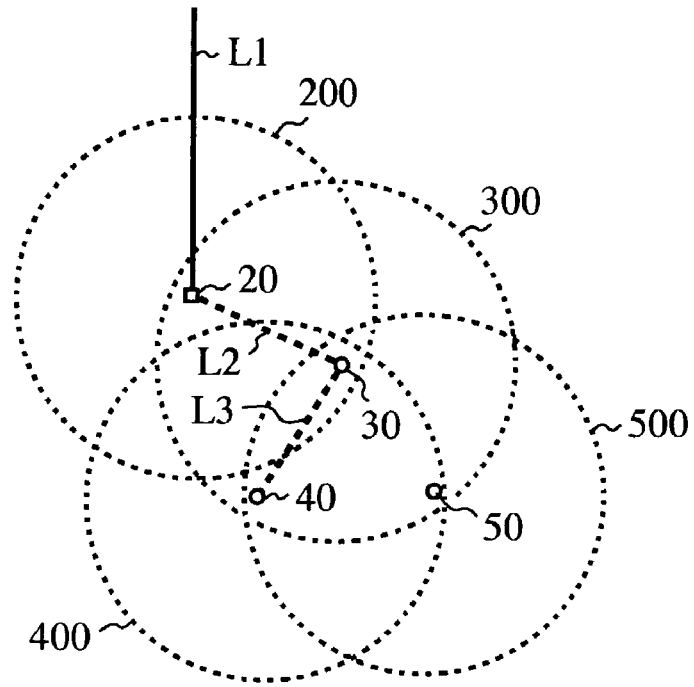
FIG. 9 is a schematic view showing the configuration of a network system according to a fifth embodiment of the present invention.

FIG. 9 is a schematic view showing the configuration of a network system according to a fifth embodiment of the present invention. The constituent elements, which are the same as those shown in FIG. 7, are indicated by the same reference numerals as those of the constituent elements shown in FIG. 7.

In FIG. 9, 500 indicates a communication zone of the access router 50. The access router 30 is IP-connected with the gateway router 20 through the wireless link L2, and the access router 40 is IP-connected with the access router 30 through the wireless link L3. Therefore, a network system has been already made by the gateway router 20, the access router 30, the access router 40, the wire link L1, the wireless link L2 and the wireless link L3. The access router 50 is positioned within the communication zone 300 and the communication zone 400, and the access routers 30 and 40 are placed within the communication zone 500.

In the fifth embodiment, when the access router 50 is IP-connected with the access router 30, another wireless link connecting the gateway router 20 and the access router 30 is added to the network system.

Figure 10:
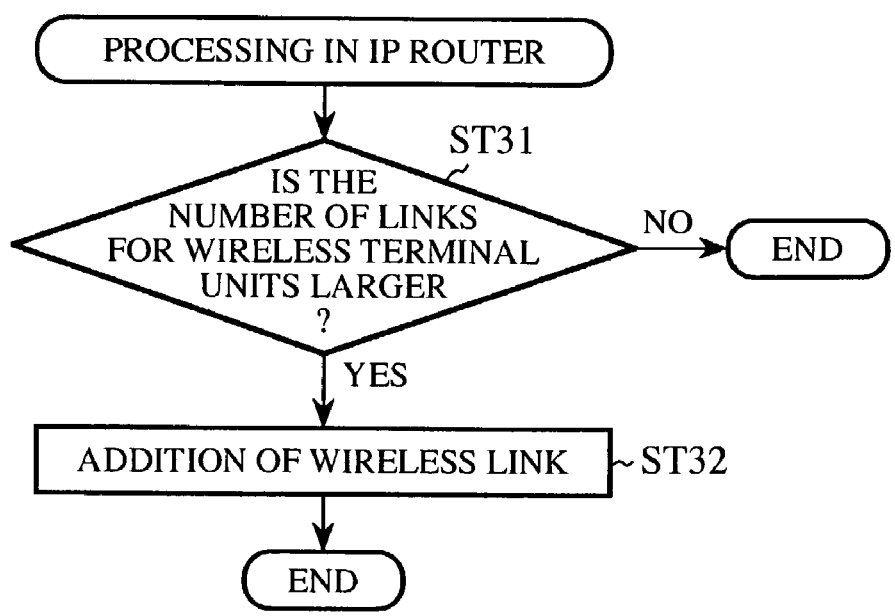
FIG. 10 is a flow chart showing the processing of wireless link addition according to a network making method in the network system of the fifth embodiment of the present invention.

FIG. 10 is a flowchart showing the processing of wireless link addition according to a network making method in the network system of the fifth embodiment of the present invention. The processing shown in FIG. 10 is performed before the step ST14 shown in FIG. 6.

After the access router 50 is IP-connected with the access router 30, it is checked whether or not the number of wireless links IP-connected with wireless terminal units respectively is larger than the number of wireless links respectively connecting the gateway router 20 and the access router 30 (step ST31). In cases where the number of wireless links IP-connected with wireless terminal units respectively is larger than the number of wireless links respectively connecting the gateway router 20 and the access router 30 ("YES" in the step ST31), multi-link adding processing is performed (step ST32) to add a wireless link connecting the gateway router 20 and the access router 30 to the network. Therefore, the data transfer capability can be obtained in the whole access network system in good balance.

The multi-link adding processing is substantially the same as the processing of the IP-connection between the gateway router 20 and the access router 30. In cases where an IP address to be registered in the same manner as in the step ST7 or an IP address to be registered in a route table in the same manner as in the step ST14 exists, the IP address is registered in a queue management unit equivalent to that used in a point-to-point protocol (PPP) multi-link.

In the IP-connection between IP routers, each of Bluetooth devices of the IP routers has only one wireless link. Therefore, in cases where there is no wireless link connecting the gateway router 20 and the access router 30 in the multi-link adding processing, the multi-link adding processing is not performed in the step ST32.

As is described above, in the fifth embodiment, each of the access routers 40 and 50 is IP-connected with the access router 30 connected with the gateway router 20 through one wireless link, and the access router 30 has a non-used wireless link. In this case, the access router 30 is IP-connected with the gateway router 20 through the non-used wireless link to connect the gateway router 2 and the access router 30 through the multi-link (the wireless link L2 and the non-used wireless link). Accordingly, the data transfer capability can be obtained in the whole access network system in good balance.

Embodiment 6

Figure 11:
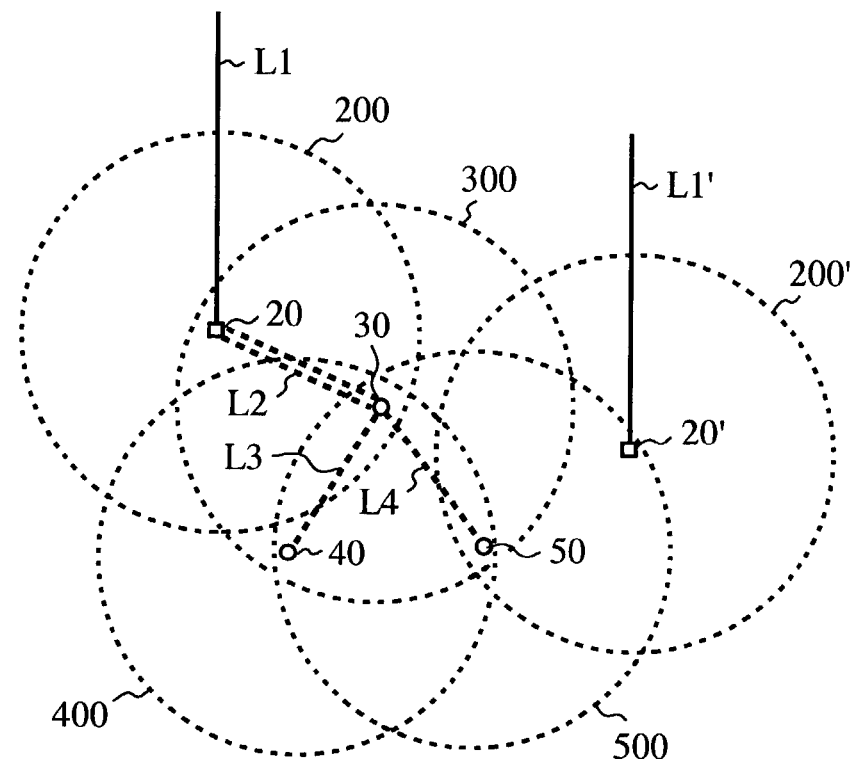
FIG. 11 is a schematic view showing the configuration of a network system according to a sixth embodiment of the present invention.

FIG. 11 is a schematic view showing the configuration of a network system according to a sixth embodiment of the present invention. The constituent elements, which are the same as those shown in FIG. 9, are indicated by the same reference numerals as those of the constituent elements shown in FIG. 9.

In FIG. 11, 20' indicates another gateway router. The gateway router 20' is connected with the internet 10 (refer to FIG. 1) through a wire link L1'. 200' indicates a communication zone of the gateway router 20'. The access router 50 is placed within the communication zone 200', and the gateway router 20' is placed within the communication zone 500. Therefore, the gateway router 20' is added to the access network shown in FIG. 7, and a traffic in the access network is divided into a traffic of the gateway router 20 and a traffic of the gateway router 20'.

An operation performed in the access network will be described below.

As is described in the fifth embodiment, the access router 30 is IP-connected with the gateway router 20 through both the wireless link L2 and one wireless link, the access router 40 is IP-connected with the access router 30 through the wireless link L3, and the access router 50 is IP-connected with the access router 30 through the wireless link L4. In a first stage, the gateway router 20' is not placed in the access network system.

The access router 50 checks a change of the configuration of the network IP-connected with the access router 50 at a low frequency (for example, every one hour). In detail, the access router 50 receives a checking instruction from a timer of the access router 50 for each checking operation. When the access router 50 receives one checking instruction, the access router 50 issues the procedure of "inquiry", and the access router 50 receives a list of a plurality of device addresses of Bluetooth devices of the IP routers 30 and 40, which are possible to be IP-connected with the access router 50 or are actually IP-connected with the access router 50, from the IP routers 30 and 40. In cases where the configuration of the network system is not changed, the list of the device addresses received in a current checking operation is the same as that received in a preceding checking operation.

In a second stage, the gateway router 20' is additionally placed in the access network to change the configuration of the network system. In this case, the access router 50 receives a list of a plurality of device addresses of Bluetooth devices of the IP routers 20', 30 and 40, which are possible to be IP-connected with the access router 50 or are actually IP-connected with the access router 50, from the IP routers 20', 30 and 40 in a current checking operation, and the list of the device addresses received in the current checking operation differs from that received in a preceding checking operation. Therefore, a change of the configuration of the network system IP-connected with the access router 50 is recognized in the access router 50. Thereafter, the processing shown in FIG. 12 is performed.

Figure 12:
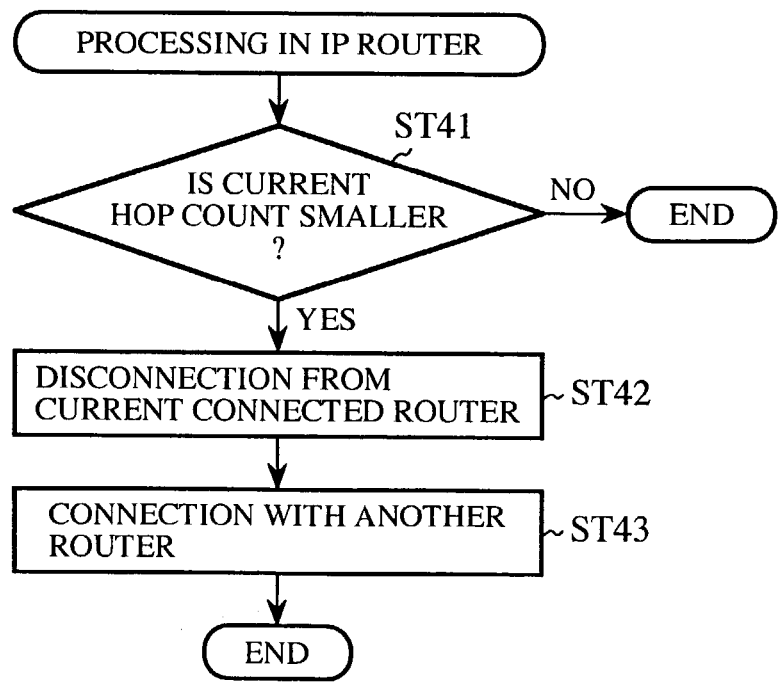
FIG. 12 is a flow chart showing the procedure of IP-connection change according to a network making method in the network system of the sixth embodiment of the present invention.

FIG. 12 is a flow chart showing the procedure of an IP-connection change according to a network making method in the network system of the sixth embodiment of the present invention.

In a step ST41, a current hop count denoting the number of access routers placed between the wire link L1 and the wireless link L4 connected with the access router 30 is compared with a new hop count denoting the number of access routers placed between the wire link L1' connected with the gateway router 20' and a wireless link of an IP router (in this embodiment, the gateway router 20'). Because the new hop count equal to 0 is smaller than the current hop count equal to 1, the procedure proceeds to a step ST42 and a step ST43.

In the step ST42, the access router 50 is disconnected from the access router 30. In the step ST43, the access router 50 is IP-connected with the gateway router 20', and an IP route from the wire link L1' connected with the gateway router 20' to the wireless link connected with the access router 50 through the gateway router 20' is set in the gateway router 20'.

Therefore, in cases where a network administrator judges that the performance of the access network system for the access router 50 is low, the network administrator can improve the performance of the access network system by additionally setting the gateway router 20' at an appropriate position placed within the communication zone 500 of the access router 50.

Also, the network administrator can perform a maintenance operation (for example, the expansion, strengthening and change of the network system) of the wireless access network by connecting a remarked access router (that is, the access router 50) to an electrical wire or setting the gateway router 20' in the network system while considering the communication zone of the remarked access router or by disconnecting the remarked access router from the electrical wire or removing the gateway router 20' from the network. In this case, it is applicable that the position change of the remarked access router or the gateway router 20' be not immediately influenced on the performance of the network system.

As is described above, in the sixth embodiment, the access router 50 searches the gateway router 20' and the access routers 30 and 40 for a non-used wireless link. When a non-used wireless link corresponding to a data transfer capability higher than that of a wireless link IP-connected with the access router 50 is found out, the IP-connection of the access router 50 with the access router 30 is changed to the IP-connection of the access router 50 through the non-used wireless link corresponding to the higher data transfer capability. Accordingly, the data transfer capability for the access router 50 can be heightened.

Also, in the sixth embodiment, the access router 50 searches for a non-used wireless link in response to a network remaking trigger periodically generated in the timer. Therefore, the performance of the access network system can be improved.

In the sixth embodiment, the heightening of the data transfer capability is not limited to the hop count, and it is applicable that the heightening of the data transfer capability be judged according to the data transfer rate in the same manner as in the fourth embodiment.

Also, in the sixth embodiment, the function for searching for a non-used wireless link corresponding to a higher data transfer capability is not limited to the access router 50, and it is applicable that the access router 30 or 40 have the searching function.

Also, in the sixth embodiment, in cases where the access router 50 is not IP-connected with any IP router, the access router 50 checks a change of the configuration of the network placed within the communication zone 500 of the access router 50 at a high frequency (for example, every one minute).

Embodiment 7

In the sixth embodiment, each IP router searches for a non-used wireless link in self-control in response to a network remaking trigger periodically generated in the timer of the IP router. However, in a seventh embodiment, a network administrator explicitly controls IP routers to reconstruct the network system.

Each access router has a dedicated port for datagram packet to receive a network remaking command sent from the network administrator in the dedicated port. When the network administrator sends a network remaking command to a plurality of broadcast IP addresses in a form of a datagram packet, each access router receives the network remaking command, and the access router performs the processing of the network remaking in the same manner as in the sixth embodiment. In this case, because the access routers almost simultaneously start the processing of the network remaking, conflict among the access routers occurs. However, because the operations of the network remaking in the access routers are serialized at the wireless link level, no problem is arisen.

The sending of the network remaking command from the network administrator to each access router is not limited to the broadcast IP address. Because the network administrator knows a device address of each Bluetooth device used for the IP-connection of the access routers, the network administrator can know an IPv6 address formed as a state-less address. Therefore, the network administrator can specify the IPv6 address as an IP address of each access router to send the network remaking command to the access router. Also, the network administrator can manage the network system by using a graphical user interface.

As is described above, in the seventh embodiment, each of the access routers and the wireless terminal units searches for a Bluetooth device corresponding to a non-used wireless link in response to a network remaking command broadcasted by the network administrator. Therefore, the network administrator can consciously improve the performance of the access network.

Embodiment 8

In an eighth embodiment, an IP-connection of a wireless terminal unit with a first IP router is changed to an IP-connection of the wireless terminal unit with a second IP router by moving the wireless terminal unit in a network system, and this IP-connection change is supported by a route setting mechanism of the network system.

Figure 13A:
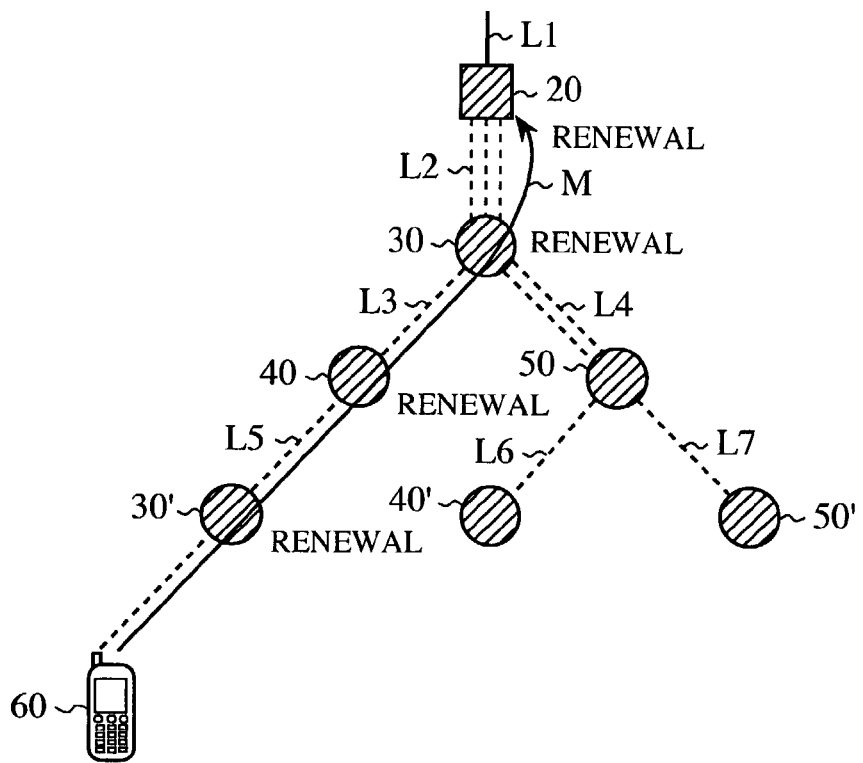
FIG. 13A is a schematic view showing the configuration of a network system, in which a wireless terminal unit is placed at a first position, according to an eighth embodiment of the present invention.
Figure 13B:
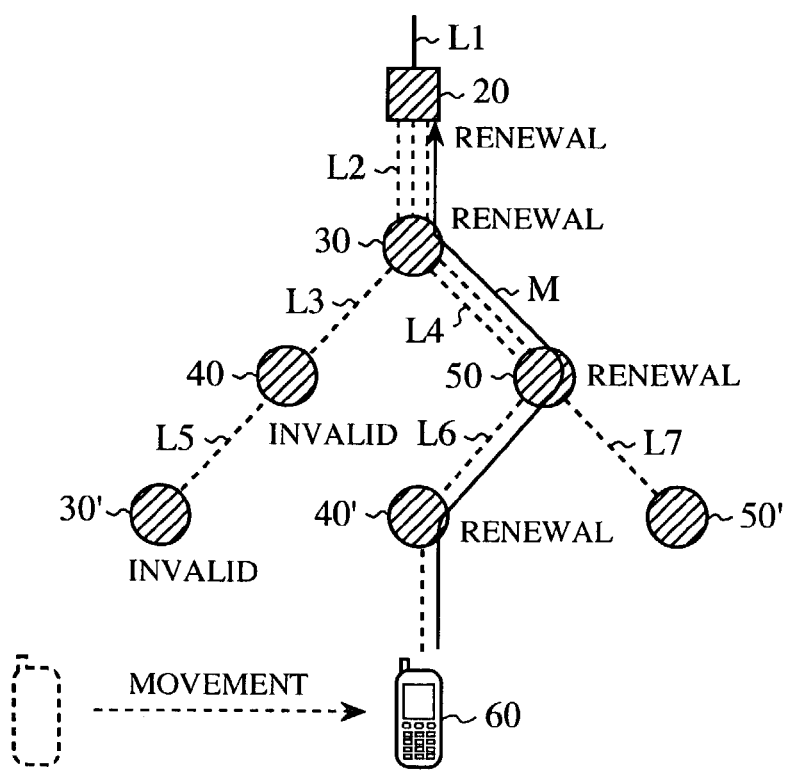
FIG. 13B is a schematic view showing the configuration of the network system, in which the wireless terminal unit is moved to a second position, according to the eighth embodiment of the present invention.

FIG. 13A is a schematic view showing the configuration of a network system, in which the wireless terminal unit 60 is placed at a first position, according to an eighth embodiment of the present invention. FIG. 13B is a schematic view showing the configuration of the network system, in which the wireless terminal unit 60 is moved to a second position, according to the eighth embodiment of the present invention. The constituent elements, which are the same as those shown in FIG. 1, are indicated by the same reference numerals as those of the constituent elements shown in FIG. 1.

In FIG. 13A and FIG. 13B, 30', 40' and 50' indicates a plurality of IP routers (hereinafter called access routers) respectively. Each of the access routers 30', 40' and 50' functions as an independent wireless station. The access router 30' is IP-connected with the access router 40 through a wireless link L5, the access router 40' is IP-connected with the access router 50 through a wireless link L6, and the access router 50' is IP-connected with the access router 50 through a wireless link L7. The access router 50 is IP-connected with the access router 30 through both the wireless link L4 and a wireless link, and the gateway router 20 is IP-connected with the access router 30 through the wireless link L2 and other two wireless links. The wireless terminal unit 60 is IP-connected with the access router 30' through a wireless link. M indicates a terminal route setting message sent from the wireless terminal unit 60 to the gateway router 20 through the access routers 30', 40 and 30.

In the eighth embodiment, when the wireless terminal unit 60 is IP-connected with one IP router (that is, one of the access routers 30 to 50 and 30' to 50' and the gateway router 20), the wireless terminal unit 60 sends a terminal route setting message M to the gateway router 20 through a plurality of access routers placed on an IP route (or a communication route) corresponding to the wireless terminal unit 60 every predetermined time period. Each of the access routers 30 to 50 and 30' to 50' and the gateway router 20 has a table of IP routes corresponding to a plurality of wireless terminal units respectively. When the gateway router 20 receives the terminal route setting message M from the wireless terminal unit 60, a current IP route corresponding to the wireless terminal unit 60 is sent from the gateway router 20 to each of the access routers 30 to 50 and 30' to 50', and the IP route table is registered and renewed in each of the access routers 30 to 50 and 30' to 50'.

In the inter-router connection between the gateway router 20 and one access router and the inter-router connection between access routers, each Bluetooth device of one IP router can be IP-connected with only one Bluetooth device of another IP router through one wireless link. That is, the Bluetooth device and the wireless link have the relation of one-to-one correspondence. In contrast, in the terminal-router connection between one IP router (that is, the gateway router 20 or one access router) and the wireless terminal unit 60, one Bluetooth device of one IP router is set as a master device, a piconet is produced to IP-connect a maximum of seven wireless terminal units with the Bluetooth device of the IP router. For the production of the piconet, an IP over Bluetooth method requested by the Internet Engineering Task Fource (IETF) is adopted.

Next, an operation of the network system will be described below.

The wireless terminal unit 60 issues the procedure of "inquiry" to search IP routers (that is, the gateway router 20 and access routers) possible to be IP-connected with the wireless terminal unit 60 for a Bluetooth device corresponding to a non-used wireless link. In this wireless link producing operation, to perform the production of a wireless link between the wireless terminal unit 60 and one IP router at high speed, the Bluetooth device 65 of the wireless terminal unit 60 is set to a master device, and a Bluetooth device of the corresponding IP router is set to a slave device. As shown in FIG. 13A, the wireless terminal unit 60 tries to be IP-connected with the access router 30', the access router 30' issues the procedure of "change role" in Bluetooth to the wireless terminal unit 60, the Bluetooth device 65 of the wireless terminal unit 60 is changed to a slave device, and one Bluetooth device of the access router 30' is changed to a master device.

The whole access network is treated as one IP subnetwork, an IP address of the wireless terminal unit 60 is stored in an IP address database managed by the gateway router 20. When the wireless terminal unit 60 is IP-connected with the access network system, the IP address of the wireless terminal unit 60 is provided for the wireless terminal unit 60.

In the IP-connection state shown in FIG. 13A, the wireless terminal unit 60 sends the terminal route setting message M to the gateway router 20. In this case, each of the access routers 30', 40 and 30 and the gateway router 20 placed on the IP route from the wireless link of the wireless terminal unit 60 to the wire link L1 of the gateway router 20 receives the terminal route setting message M, and an IP route from the wireless terminal unit 60 to the corresponding IP router is set and registered in the IP router to renew the IP route.

Thereafter, as shown in FIG. 13B, the wireless terminal unit 60 is moved within a communication zone of the access router 40' while keeping the IP-connection with the access router 30'. In this case, in the wireless terminal unit 60, an electric field intensity of the wireless link connecting the wireless terminal unit 60 and the access router 40' is compared with a threshold value of the electric field intensity. In cases where the electric field intensity of the wireless link is sufficiently higher than the threshold value, the IP-connection of the wireless terminal unit 60 with the access router 30' is changed to the IP-connection of the wireless terminal unit 60 with the access router 40'. Because the wireless terminal unit 60 sends the terminal route setting message M to the gateway router 20 every predetermined time period, each of the access routers 40', 50 and 30 and the gateway router 20 placed on a changed IP route from the wireless terminal unit 60 to the gateway router 20 receives the terminal route setting message M, and an IP route from the wireless terminal unit 60 to the corresponding IP router is set and registered in the IP router to renew the IP route.

In contrast, the terminal route setting message M is not received in any of the access routers 30' and 40. When a non-reception time period for the terminal route setting message M exceeds a predetermined time period in the access routers 30' and 40, it is judged in the access routers 30' and 40 that the IP route for the wireless terminal unit 60 is invalid. Therefore, in the access routers 30' and 40, the IP route for the wireless terminal unit 60 registered in the table is set to be invalid. In this case, the inter-router connection among the gateway router 20 and the access routers 30', 40 and 30 is maintained.

Because of the above-described route setting mechanism of the network system, the IP address of the wireless terminal unit 60 obtained from the gateway router 20 can be held in the wireless terminal unit 60, a hand-over mechanism from one IP router (in this embodiment, the access router 30') to another IP router (in this embodiment, the access router 40') can be provided for the wireless terminal unit 60. Therefore, even though the wireless terminal unit 60 IP-connected with a first IP-router is moved within the communication zone of a second IP-router, the IP-connection of the wireless terminal unit 60 with the first IP-router can be changed to the IP-connection of the wireless terminal unit 60 with the second IP-router. Accordingly, a network system not inferior to a network system of a wireless local area network (LAN) can be made up. For example, even though the wireless terminal unit 60 IP-connected with the network system is moved during a download operation of a large amount of file from a server of the internet 10 to the wireless terminal unit 60, the download operation can be continued without stopping the download operation.

As is described above, in the eighth embodiment, each of the gateway router 20 and the access routers 30 to 50 and 30' to 50' has a table of IP routes corresponding to wireless terminal units respectively, the wireless terminal unit 60 IP-connected with one IP router sends the terminal route setting message M to the gateway router 20 through access routers placed on a current IP route of the wireless terminal unit 60, and each of the gateway router 20 and the access routers receiving the terminal route setting message M sets and registers the IP route of the wireless terminal unit 60 in the IP route table. Also, in cases where the terminal route setting message M is not received in any of the access routers 30' and 40 for a non-reception time period exceeding a predetermined time period, the IP route of the wireless terminal unit 60 is set in the access routers 30' and 40 to be invalid in the IP route table. Therefore, even though the wireless terminal unit 60 IP-connected with the access router 30' is moved within the communication zone of the access router 40', the IP-connection of the wireless terminal unit 60 with the access router 30' can be changed to the IP-connection of the wireless terminal unit 60 with the access router 40'. Accordingly, the hand-over mechanism for supporting the movement of the wireless terminal unit 60 in the network system can be provided for the wireless terminal unit 60.

In the eighth embodiment, the electric field intensity of the wireless link is compared with the threshold value to judge whether or not the IP-connection of the wireless terminal unit 60 is changed. However, this embodiment is not limited to the electric field intensity.

Also, each embodiment of the present invention is not limited to the wireless link of the Bluetooth device, and it is applicable that each of routers and wireless terminal units have any type of short-distance wireless communication device.

Also, in the embodiments of the present invention, the number of gateway routers or the number of access routers is not limited. Also, the number of Bluetooth devices of each IP router functioning as short-distance wireless communication devices is not limited. It is applicable that the number of IP routers or the number of Bluetooth devices of each IP router be determined on demand.

What is claimed is:

1. A network system comprising:
a wire link;
a plurality of wireless links;
a gateway router, with which a wireless terminal unit is connected through the wireless links and which is connected with the wire link, for setting a communication route from the wireless link directly connected with the wireless terminal unit to the wire link to function as a gateway to the wire link; and
one or more access routers, at least one of which connects the gateway router and the wireless terminal unit through the wireless links, for setting a communication route from the wireless link connected with the gateway router to the wireless link connected with the wireless terminal unit, wherein the gateway router sets a communication route from the wireless link connected with the wireless terminal unit to the wire link through the other wireless link or the other wireless links connected with the one or more access routers to function as a gateway to the wire link;

wherein one remarked access router is connected through a first wireless link with the gateway router or another access router, the remarked access router searches the gateway router and the other access routers for a non-used wireless link having data transfer capability higher than that of the first wireless link, the connection of the remarked access router through the first wireless link is changed to the connection of the remarked access router with the gateway router or one of the other access routers through the non-used wireless link having data transfer capability higher than that of the first wireless link, the gateway router and the one or more access routers are configured as master devices, while the wireless terminal is configured as a slave device, the communication route includes the changed connection of the remarked access router through the non-used wireless link, and the communication route is set such that every node connecting the wireless terminal to the wire link is a gateway router or access router.

2. A network system according to claim 1, wherein the remarked access router searches for the non-used wireless link according to a network remaking trigger periodically generated in a timer.

3. A network system according to claim 1, wherein the remarked access router searches for the non-used wireless link according to a network remaking command broadcasted by a network administrator.

4. A network system according to claim 1, wherein the data transfer capability of the non-used wireless link or the first wireless link is estimated according to a hop count denoting the number of access routers between the wire link and the non-used wireless link or the first wireless link.

5. A network system according to claim 1, wherein the data transfer capability of the non-used wireless link or the first wireless link is estimated according to a data transfer rate of the non-used wireless link or the first wireless link.

6. A network system according to claim 1, wherein the wireless terminal is configured to issue an inquiry in order to establish a direct wireless link with one of the master devices in the network system, and each master device within a proximity of the wireless terminal is configured to respond to the inquiry to establish, if available, the direct wireless link.

7. A network system according to claim 1, wherein the gateway router is an internet protocol (IP) router, and the wire link is connected to the internet.

8. A network system according to claim 1, further comprising:

a wire network connected with the gateway router through the wire link; and an authentication database, disposed in the wire network, for registering authentication data used for authenticating the wireless terminal unit, wherein a communication route from the wireless terminal unit to the wire network is set for the wireless terminal unit, which is authenticated according to the authentication data registered in the authentication database.

9. A network system according to claim 1, further comprising:

a wire network connected with the gateway router through the wire link; and an accounting database, disposed in the wire network, for storing accounting information which denotes a charge for communication performed by the wireless terminal unit and is produced according to a connect time period of the wireless terminal unit.

10. A network system according to claim 1, wherein the gateway router provides benefit information registered in advance for the wireless terminal unit connected with the gateway router through the wireless link or the wireless links.

11. A network system according to claim 1, wherein each wireless link is formed as one of the following:

a link between a Bluetooth device of the gateway router and a Bluetooth device of the wireless terminal unit, a link between the Bluetooth device of the gateway router and a Bluetooth device of one access router, a link between the Bluetooth device of the wireless terminal unit and a Bluetooth device of one access router, or a link between a Bluetooth device of one access router and a Bluetooth device of another access router, and wherein an inactive time period in a standby mode of each Bluetooth device is set to zero.

* * * * *